May 5, 1931.   J. B. TAYLOR   1,803,540
DUST SEPARATOR
Filed Dec. 28, 1927   3 Sheets-Sheet 1
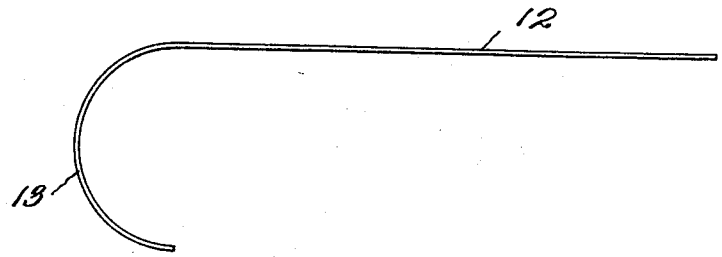
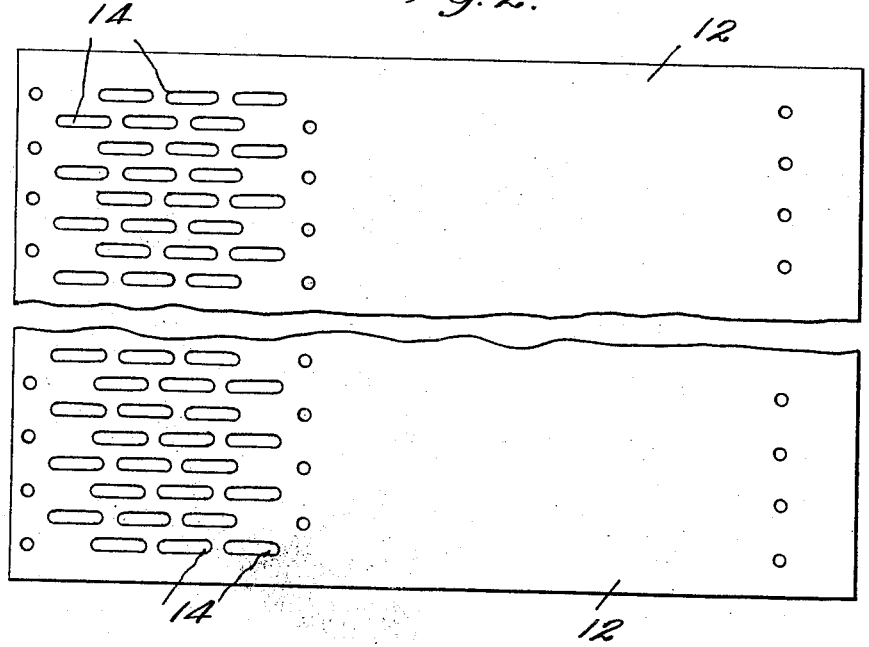
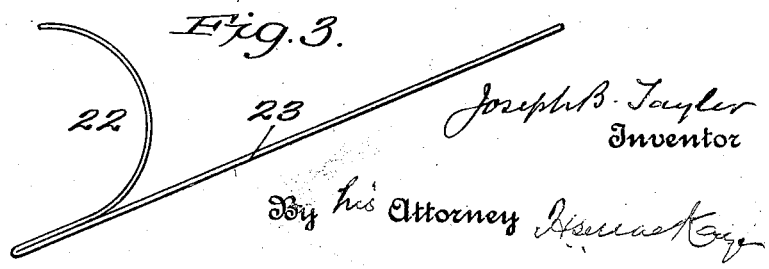
Joseph B. Taylor
Inventor
By his Attorney May 5, 1931. J. B. TAYLOR 1,803,540
DUST SEPARATOR
Filed Dec. 28, 1927 3 Sheets-Sheet 2
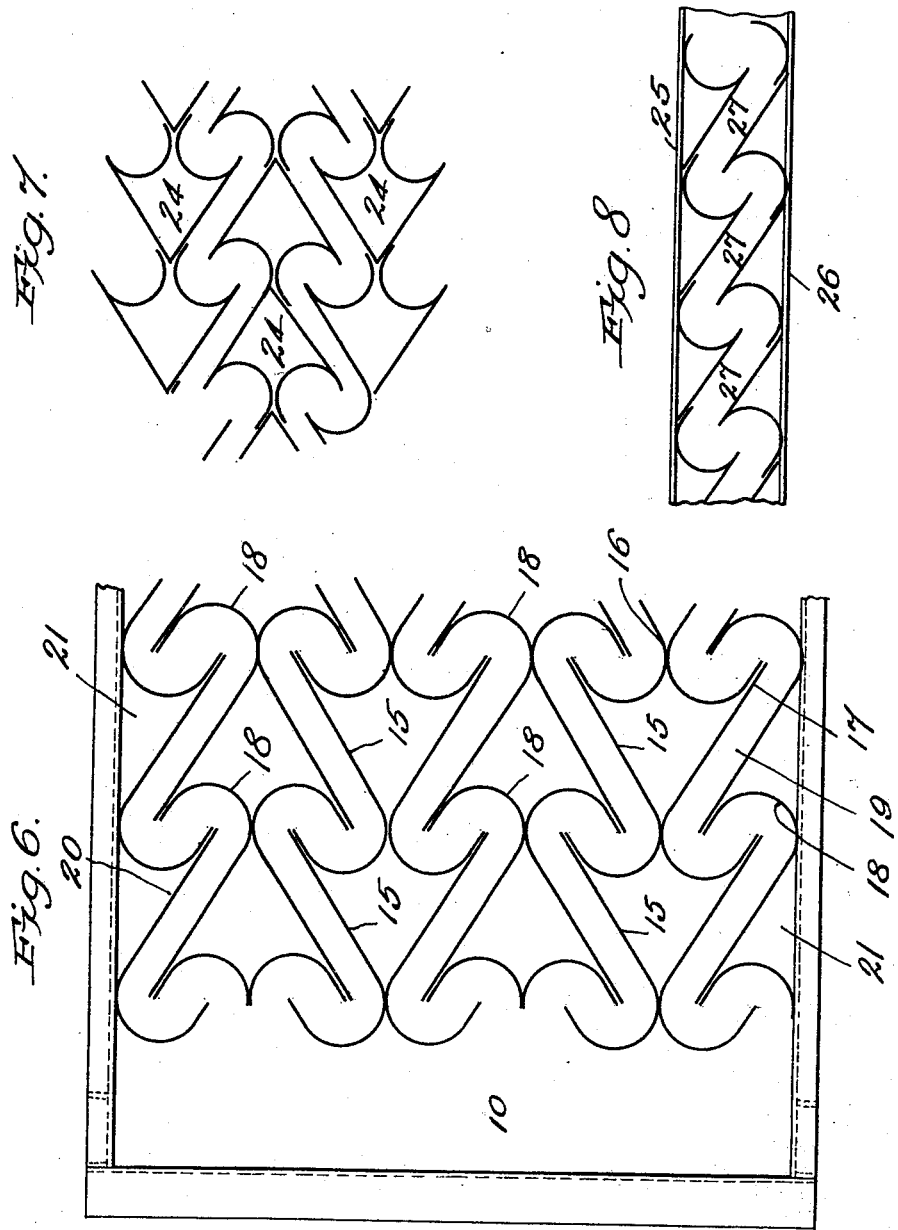

May 5, 1931. J. B. TAYLOR 1,803,540
DUST SEPARATOR
Filed Dec. 28, 1927 3 Sheets-Sheet 3
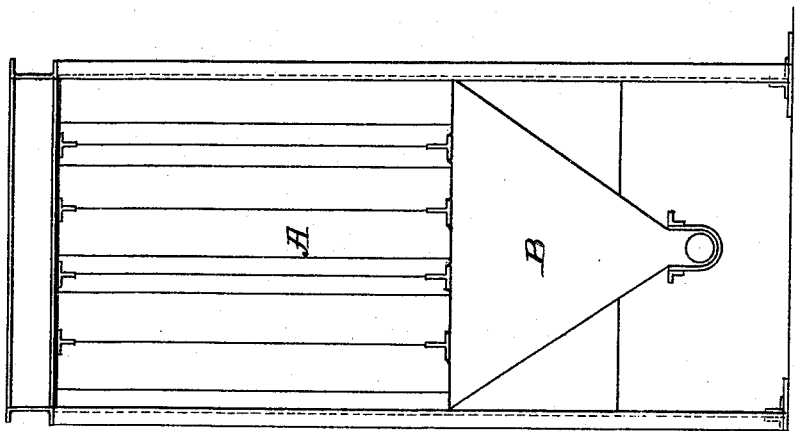
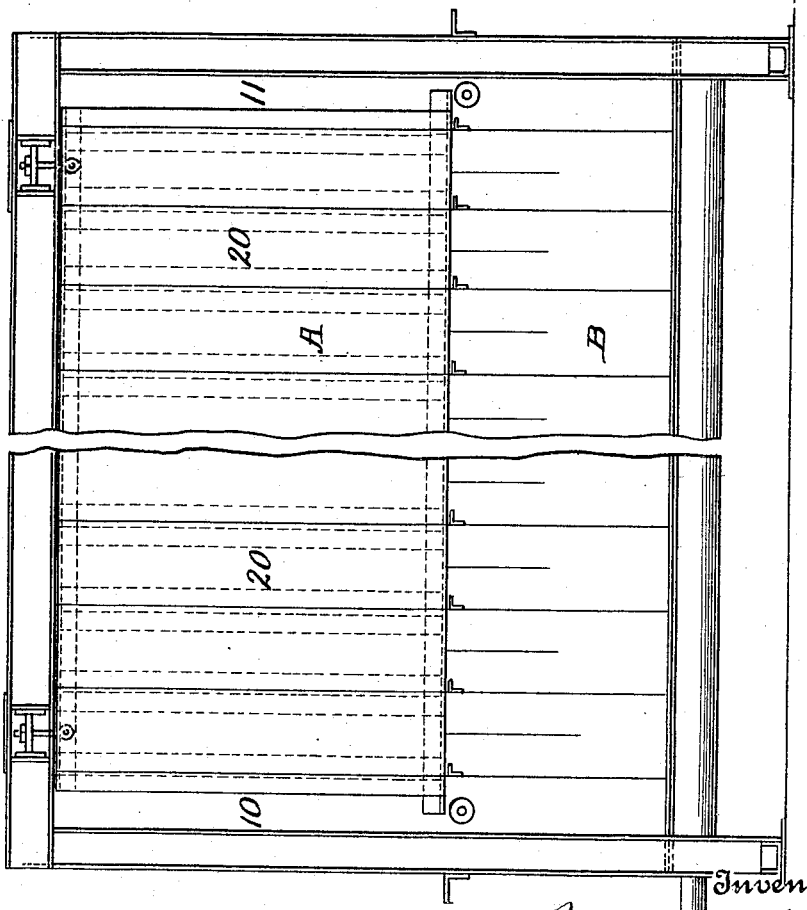
Inventor
Joseph B. Taylor
By his Attorney Patented May 5, 1931

1,803,540

UNITED STATES PATENT OFFICE

JOSEPH B. TAYLOR, OF ALLENDALE, NEW JERSEY

DUST SEPARATOR

Application filed December 28, 1927. Serial No. 243,041.

The present invention relates to a novel and effective form of dust separator of the type wherein dust laden air or gas is propelled through one or more passages so formed as to subject the air current or currents to a series of sudden changes in direction the effect of which is to separate the entrained dust particles by virtue of their inertia, and wherein some of the particles so separated are made to pass through suitable perforations in the wall of the air passage and into one or more "dead air chambers" where this dust collects and from which it can be removed from time to time.

I have disclosed and claimed an example of a separator of the type above mentioned in my U. S. Letters Patent for dust separator, No. 1,527,235, dated Feb. 24th, 1925, wherein the complete machine is formed of removable units conveniently assembled in such numbers as are found suitable under the particular circumstances of a given case.

The present invention relates to a device built up of units of an improved form, affording greater simplicity of structure and decreasing the first cost of a machine of a given size and output.

My improved device is illustrated in a preferred form in the accompanying drawings, wherein Figure 1 is an edge view of one of the simple unitary elements of which the air passages and dead air chambers are composed, Figure 2 is a view in elevation of one of such elements before being given the final curved form, Figure 3 is an edge view of a modified form of unit, Fig. 4 is a diagrammatic side view of a complete machine with one side wall removed, Figure 5 is a similar end view of the same with one end wall removed, Figure 6 is a diagrammatic horizontal section through the air passages and dead air chambers, and Figures 7 and 8 are similar views of modified forms.

For the sake of brevity, the following specification will be limited to description of means for separating dust, smoke or fumes from air or other gases; but the invention is not limited to apparatus for this purpose, since it may also be used for separating solids in suspension in liquids. Accordingly the expression "dead air space" and the like is to be understood as a convenient expression covering a space containing any fluid (liquid or gas) in a quiescent condition.

As explained in my patent aforesaid, No. 1,527,235, separators of the type here in question comprise two parts. The upper part comprises the passages for conveyance of the dust-laden air or the like and the means for the immediate separation of the suspended matter, while the lower portion comprises chambers into which the separated material is made to fall through a perforated floor between the two sections. In Figures 4 and 5 hereof the upper portion or section is indicated generally by the letter A and the lower portion by the letter B. The improvements herein claimed have relation solely to the upper portion A, so that the details of construction of the section B are not hereinafter described.

Referring to Figures 4 and 6, the dust laden air (or other fluid) enters at 10 and leaves the separator at 11, being propelled in the direction of the arrows in any well known manner. Between 10 and 11 the current is made to pass through the dust-separating passages which may be constructed as follows.

A flat plate 12, preferably of sheet steel or the like is bent at one end to form a curve 13 as shown in Figure 1, and the curve so formed is provided with numerous apertures or short slits 14, as shown in Figure 2.

A succession of dust-receiving dead air chambers 15, in horizontal section somewhat resembling an arrow head, are produced as shown in Figure 6, as follows.

Two units of the kind shown in Figure 1 are bolted or otherwise fastened together with their recurved portions in contact as at 16 in Figure 6, and similar united units in pairs are joined to those behind with the extreme edge of the recurved portions of the rearward pair united to the extreme rearward edges of the imperforate parts of the forward units, as at 17.

In Figures 6, 7 and 8, which are diagrammatic, the lines representing the individual contacting units are shown slightly separated, in order to make it easy to see each unit separately in its relation to its fellows. It is to be understood, of course, that the plates are securely joined together at all points of junction, so as to form air tight passages, save where the openings 14 occur.

Alongside of the row of chambers 15 thus formed is placed a second parallel row of similar chamber 18, pointing in the opposite direction to the chambers 15. These chambers 18 are formed in the same manner as the chambers 15. As shown in Figure 6, the radius of curvature of each elementary unit plate is preferably somewhat greater than the distance between the flat positions of the adjacent plates, forming an enlargement of the passage at the curved portion. Beyond the chambers 18 is another row of chambers 15, and any convenient number of rows may thus be laid together in the rapid and easy assembling of my device.

It will be seen that, by this arrangement, air passages 19 are formed in successive sections, in each of which the extreme edge of the recurved perforated portion of one elementary unit 12 extends into the concave of the recurved portion of another such unit.

At the two sides and against the inner faces of the side walls of the entire device, elementary units are placed as shown at 20 to form half chambers 21.

As the currents of dust-laden fluid move rapidly through the high narrow parallel passages 19, formed as aforesaid, they suffer rapid reversals as they reach the successive recurved portions of the elementary units. some of the entrained or suspended particles of dust etc. are projected by inertia through the perforations in these recurved portions and enter the successive dead air chambers while some of said particles adhere to the concave surfaces against which they are driven. The chambers 15 are thus entered from the side facing the original direction of the current and the chambers 18 from the opposite side. It will be seen that these chambers correspond functionally with the chambers 17 and 18 of my aforesaid earlier patent. The dust may be made to drop into the lower section B by vibration or otherwise, as in the earlier patent.

While the form of elementary unit employed and the mode of assembly the same are preferably as above described, the principle of the invention is capable of embodiment is a variety of modified forms, some of which are exemplified in Figures 3, 7 and 8.

As shown in Figure 3, instead of forming the elementary unit by bending a plate so that the concave of the curve faces the body portion of the plate, the curve may assume the position shown at 22, where, the convex surface faces the body portion 23. An elementary unit of this kind may be made either with the curve forming a part of the entire plate 22, 23, or the part 22 may be attached to the body plate 23 by electric welding or otherwise.

Units of this kind may be assembled in various ways to obtain the advantages of my invention. One way is shown in Figure 7, which produces a grouping differing from that shown in Figure 6 principally in that each successive dead air chamber 24 is completed by the juxtaposition of two units whose curved portions 22 are jointed at their edges.

In Figure 8 is shown a mode of assembly wherein either the units as in Figure 1 or as in Figure 2 may be used. This corresponds to the structure at the sides of the device as illustrated in Figure 6, where a series of air chambers 21 are formed by units as in Figure 1 applied in a connected series along the inner surface of a flat plate.

In Figure 8 this structure is shown duplicated, units as in Figure 2 being used on two external flat plates 25, 26. The air passage 27 is thus formed which supplies the required sudden changes of direction as in the other forms herein described.

It will be seen from the foregoing that my improvement makes it possible to build up the air passages and dust receiving chambers in a dust separator of the general type described from a number of substantially identical elementary units of an exceedingly simple character which can be rapidly produced from sheet metal or the like by the use of standard machinery.

My improvement may be modified in various ways without departing from the spirit of the invention which is not intended to be limited to the details herein shown and described.

What I claim is—

1. Dust separator apparatus comprising a series of passage forming units, each of which is a plate having a flat portion and a curved portion, pairs of units having their flat portions opposite one another and spaced apart to form a passage, and having their curved portions at opposite ends of the two units and the ends of the flat portions of one pair being joined to the ends of curved portions of a succeeding pair and thereby forming a passage through which dust laden fluid passes in reflexing streams.

2. Apparatus according to claim 1, in which said curved portions are perforated, and further comprising a chamber constituting a dead air space into which said perforations lead.

3. Apparatus according to claim 1, further comprising a second series of similarly arranged units with the adjacent units arranged back to back.

4. Apparatus according to claim 1, in which said curved portions are perforated and further comprising a second series of similarly arranged units with the adjacent units arranged back to back and forming between them a chamber constituting a dead air space into which said perforations lead.

5. Dust separating apparatus comprising a succession of dust receiving chambers with converging sides each having an air passage on each side and each being provided with perforated wall at the end opposite its apex, said dust receiving chambers being formed of plates having straight imperforate portions forming the converging sides of the chambers and also having curved perforate portions forming the wide ends of said chambers.

In testimony whereeof I have hereto affixed my signature on this 27th day of December, 1927.

JOSEPH B. TAYLOR.